United States Patent [19]
Kolb

[11] Patent Number: 4,671,559
[45] Date of Patent: Jun. 9, 1987

[54] DRIVING ARRANGEMENT FOR A FOLDABLE ROOF

[75] Inventor: Eugen Kolb, Stuttgart, Fed. Rep. of Germany

[73] Assignee: Dr. Ing. h.c.F. Porsche Aktiengesellschaft, Fed. Rep. of Germany

[21] Appl. No.: 736,544

[22] Filed: May 21, 1985

[30] Foreign Application Priority Data

May 29, 1984 [DE] Fed. Rep. of Germany ....... 3420016

[51] Int. Cl.⁴ .......................... B60J 7/08; F16H 1/28
[52] U.S. Cl. .................................. 296/107; 296/112; 296/115; 296/117; 74/801
[58] Field of Search ............... 296/107, 112, 115, 117; 74/801

[56] References Cited

U.S. PATENT DOCUMENTS

| | | | |
|---|---|---|---|
| 2,580,486 | 1/1952 | Vigmostad | 296/117 |
| 3,116,087 | 12/1963 | Baumann | 296/117 |
| 3,472,551 | 10/1969 | Pickles | 296/117 |
| 3,627,377 | 12/1971 | Pickles | 296/117 |
| 4,521,055 | 6/1985 | Fudala | 74/788 |
| 4,574,658 | 3/1986 | Abbott et al. | 74/801 |

OTHER PUBLICATIONS

Product Engineering, Jul. 31, 1961, pp. 31-33.

Primary Examiner—Randloph A. Reese
Assistant Examiner—Dennis H. Pedder
Attorney, Agent, or Firm—Barnes & Thornburg

[57] ABSTRACT

A driving arrangement for pivoting a folding roof between an open position and closed position which includes a driving motor unit that is connected with a respective transmission unit arranged on each side of the body, with each transmission unit cooperating with an adjusting guide member of a pivotal lever system.

In order that the driving arrangement has spatially favorable dimensions and enables a large transmission ratio, it includes spur output gearing arranged in a fixedly supported housing and planetary input gearing cooperating with the spur gearing which is operatively connected with the flexible shaft.

23 Claims, 10 Drawing Figures

DRIVING ARRANGEMENT FOR A FOLDABLE ROOF

The present invention relates to a driving arrangement for pivoting a foldable roof of a motor vehicle between an open position and a closed position, whereby the driving arrangement includes a driving motor unit which is operatively connected by means of flexible shafts with a transmission unit arranged on each side of the body and each transmission unit cooperates with an adjusting guide member of the pivotal lever system.

In a known drive arrangement of the aforementioned type (U.S. Pat. No. 3,049,935), the driving motor unit is formed by an electric motor which is arranged to the rear of the rear seat installation at the bottom side of a storage shelf for the foldable roof. The electric motor is connected with one transmission unit each arranged on each side of the body. These transmission units actuate two threaded spindles which are pivotally connected with fixedly supported adjusting guide members of the pivotal lever system by way of sleeves provided with internal threads.

This prior art arrangement entails the disadvantage that the transmission units, respectively, the threaded spindles which are arranged laterally within the area of the rear seat installation, extend from the vehicle floor up to above the belt line and have a large space requirement in the vehicle height and transverse direction, as a result of which the free design of a vehicle is impaired within this area. The relatively large width of the transmission units, as viewed in the vehicle transverse direction, is caused essentially by a horizontally arranged worm gear of the drive unit which is connected with the flexible shaft by way of a worm. As a result of the large extension of the transmission unit in the vehicle transverse direction, the utilizable vehicle interior width is impaired for the passengers on the back seat installation. Additionally, the transmission unit of the driving arrangement includes only one worm gear so that with predetermined external dimensions of the transmission unit only a limited transmission ratio is attainable. For achieving a larger transmission ratio, the worm gear would have to be dimensioned larger which, in turn, would lead to a further deterioration of the utilizable vehicle interior width. Furthermore, by reason of the fact that the electric motor protrudes into the luggage space, the volumetric capacity thereof is reduced. Therebeyond, no measures are taken in this prior art driving arrangement for the actuation of the foldable roof in the case a failure occurs in the electric drive system.

It is the object of the present invention to provide a driving arrangement which has spatially favorable dimensions and also enables large transmission ratios. Additionally, the driving arrangement should be so constructed that notwithstanding a failure in the electrical drive system, a manual actuation of the foldable roof is possible.

The underlying problems are solved according to the present invention in that each transmission unit includes a spur gear transmission arranged in a fixedly supported housing and a planetary gear cooperating with the spur gear transmission, which is operatively connected with the flexible shaft, whereby an output pinion of the planetary gear supported in a vertically extending housing wall meshes with a vertically arranged toothed segment of the spur gear transmission and in that a bearing bolt carrying the toothed segment extends through a bearing eye of the housing wall and is securely connected with the adjusting guide member on the outside of the housing.

The principal advantages achievable with the present invention reside in that the transmission unit including the vertically arranged planetary and spur gear transmissions have a flat, compact construction, as a result of which the utilizable vehicle interior space for the passengers of the rear seats is enlarged. By coupling the planetary and spur gear transmissions, large transmission ratios can be achieved with small outside dimensions. The electric motor is protected against impacts by the covered arrangement of the electric motor in the seating recess of the back seat installation and the volumetric capacity of the luggage space is not impaired. By disconnecting a single bolt, the adjusting guide member is separated from the transmission unit and the foldable roof can be actuated manually. As a result thereof, an emergency actuation is created which is simple in construction.

These and other objects, features and advantages of the present invention will become more apparent from the following description when taken in connection with the accompanying drawing which shows, for purposes of illustration only, one embodiment in accordance with the present invention, and wherein.

Figure 1:
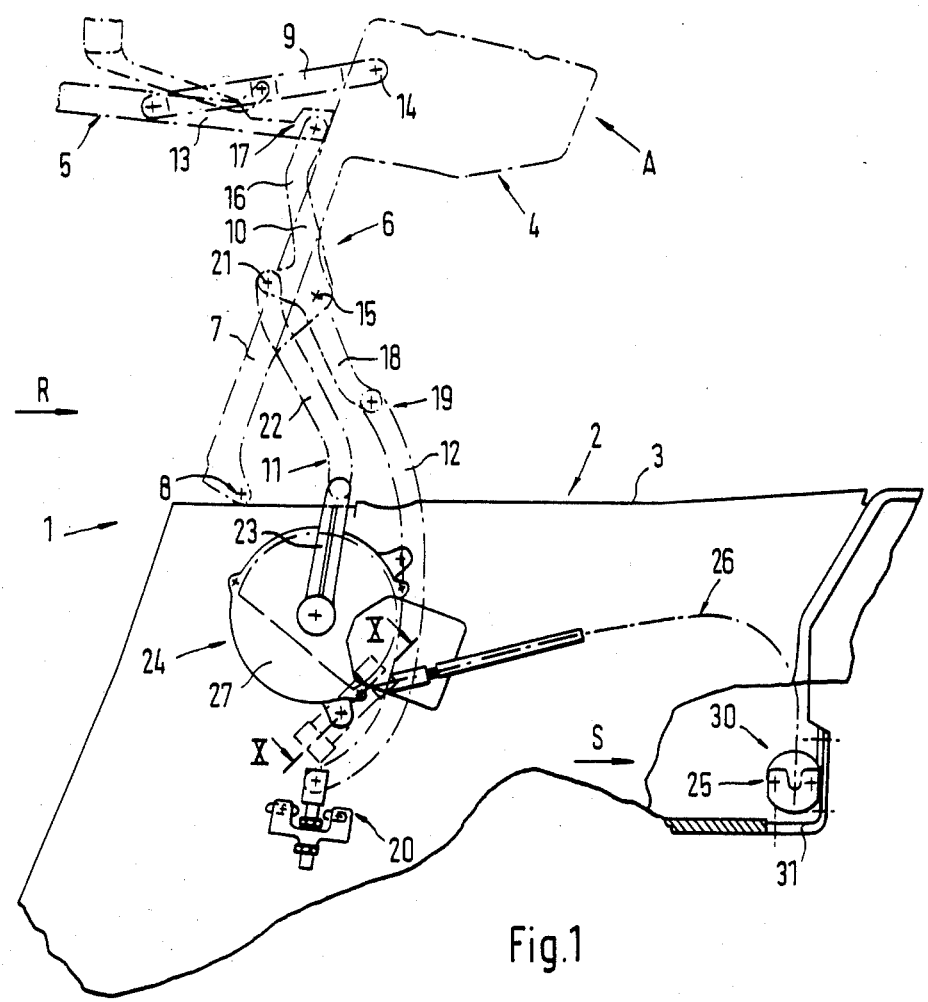
FIG. 1 is a somewhat schematic, partial side elevational view of a passenger motor vehicle with a foldable roof and a driving arrangement for pivoting the foldable roof in accordance with the present invention.

Referring now to the drawing wherein like reference numerals are used throughout the various views to designate like parts, a motor vehicle generally designated by reference numeral 1 (FIG. 1) includes in the illustrated area a body generally designated by reference numeral 2 which is formed above a belt line 3 by a foldable roof generally designated by reference numeral 4.

The foldable roof 4 includes, according to Figure 1, a roof frame generally designated by reference numeral 5 which is connected with a main hoop-shaped brace or support member 7 disposed therebehind by way of a guide lever system generally designated by reference numeral 6. The main hoop-shaped brace or support member 7 which extends arched over a passenger space, is pivotally connected at the body 2 by means of hinges 8 arranged within the area of the belt line 3.

The guide lever system 6 is composed of roof frame guide members 9 arranged on each longitudinal side of the foldable roof 4, of angle levers 10, of adjusting guide levers 11 and of retaining guide members 12. The roof frame guide member 9 is arranged above a longitudinal frame side rail and connects the latter with an upper pivot point 14 of the main brace or support member 7 (FIG. 1).

Each angle lever 10 is rotatably supported in a pivot point 15 of the main support member 7 whereby a first lever arm 16 is pivotally connected with the rear end 17 of the longitudinal frame side rail 13 and a second lever arm 18 is pivotally connected with an end 19 of the retaining guide member 12. The other end of the retaining guide member 12 is pivotally supported at the body 2 under interposition of an adjusting mechanism generally designated by reference numeral 20 (FIG. 1). Installation and manufacturing tolerances of the foldable roof 4 and of the body 2 can be compensated in the longitudinal and vertical direction by the adjusting mechanism 20.

A further point of pivotal connection 21 is provided at the angle lever 10 adjacent the point of pivotal connection 15, whereby the upper end of the adjusting guide member 11 is rotatably connected at the further point of pivotal connection 21.

According to FIG. 1, the adjusting guide member 11 is constructed in the manner of a crank drive and includes a connecting rod 22 and a crank arm 23, whereby the connecting rod 22 is connected with the point of pivotal connection 21 and the crank arm 23 with a driving arrangement generally designated by reference numeral 24. However, the possibility also exists that the adjusting guide lever 11 is formed by a one-piece component, which is arranged between angle lever 10 and driving arrangement 24.

The driving arrangement 24 for pivoting the foldable roof 4 between a closing position A and an opened position B, not illustrated in detail, includes a driving motor unit generally designated by reference numeral 25 (FIGS. 1 and 3) which is connected by means of flexible shafts 26 with transmission units 27, of which one is arranged on each side of the body 2, whereby each transmission unit 27 cooperates with the adjusting guide member 11 of the pivotal lever system 6.

Figure 3:
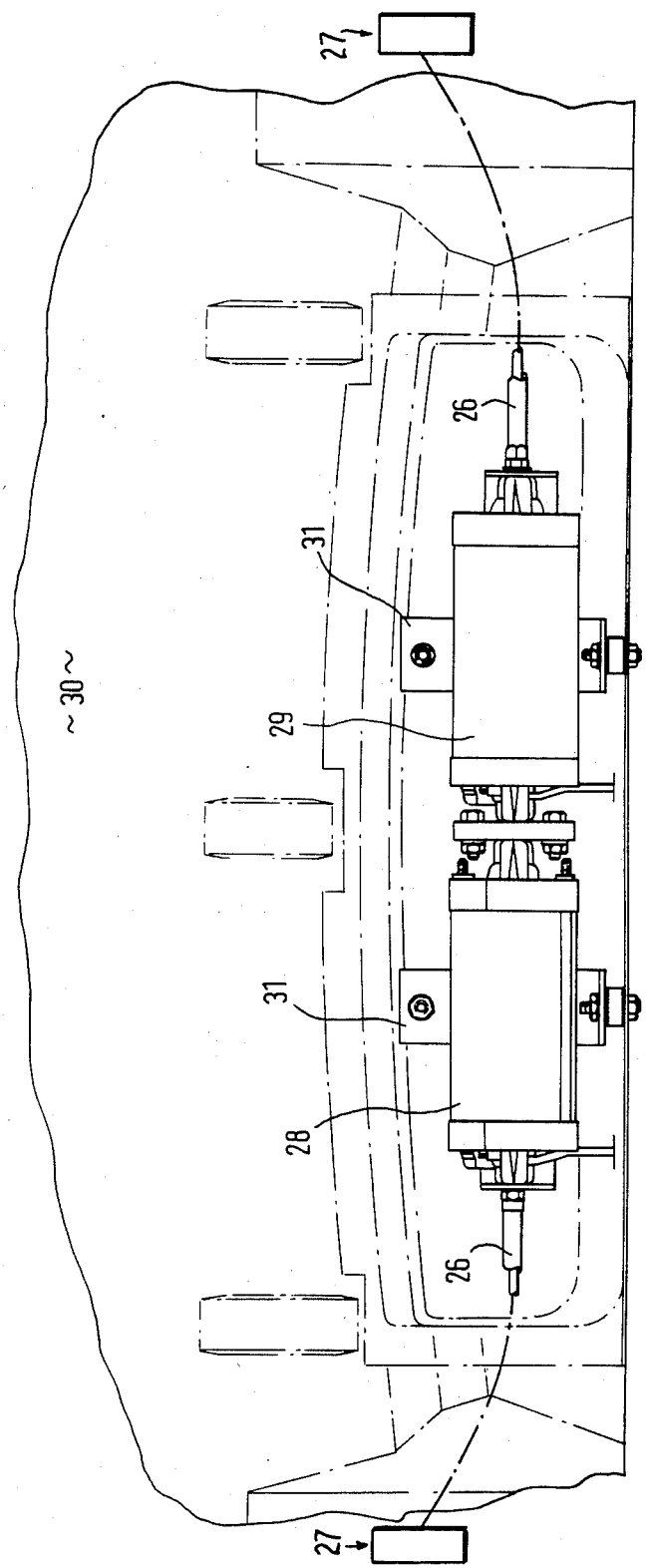
FIG. 3 is an elevational view of the driving motor unit, taken in the direction of arrow R of FIG. 1 and on an enlarged scale.

According to FIG. 3, the drive motor unit 25 consists of two electric motors 28 and 29 rigidly coupled with one another, which are arranged transversely to the vehicle longitudinal direction as well as on both sides of a vehicle longitudinal center plane. The two electric motors 28 and 29 are covered by a padding (not shown) of a rear seat installation generally designated by reference numeral 30 and are held in position by means of brackets 31 elastically supported at the rear seat installation 30 (FIG. 3). However, the possibility also exists to utilize, in lieu of two separate electric motors, a single electric motor which is constructed correspondingly large in its output.

Figure 4:
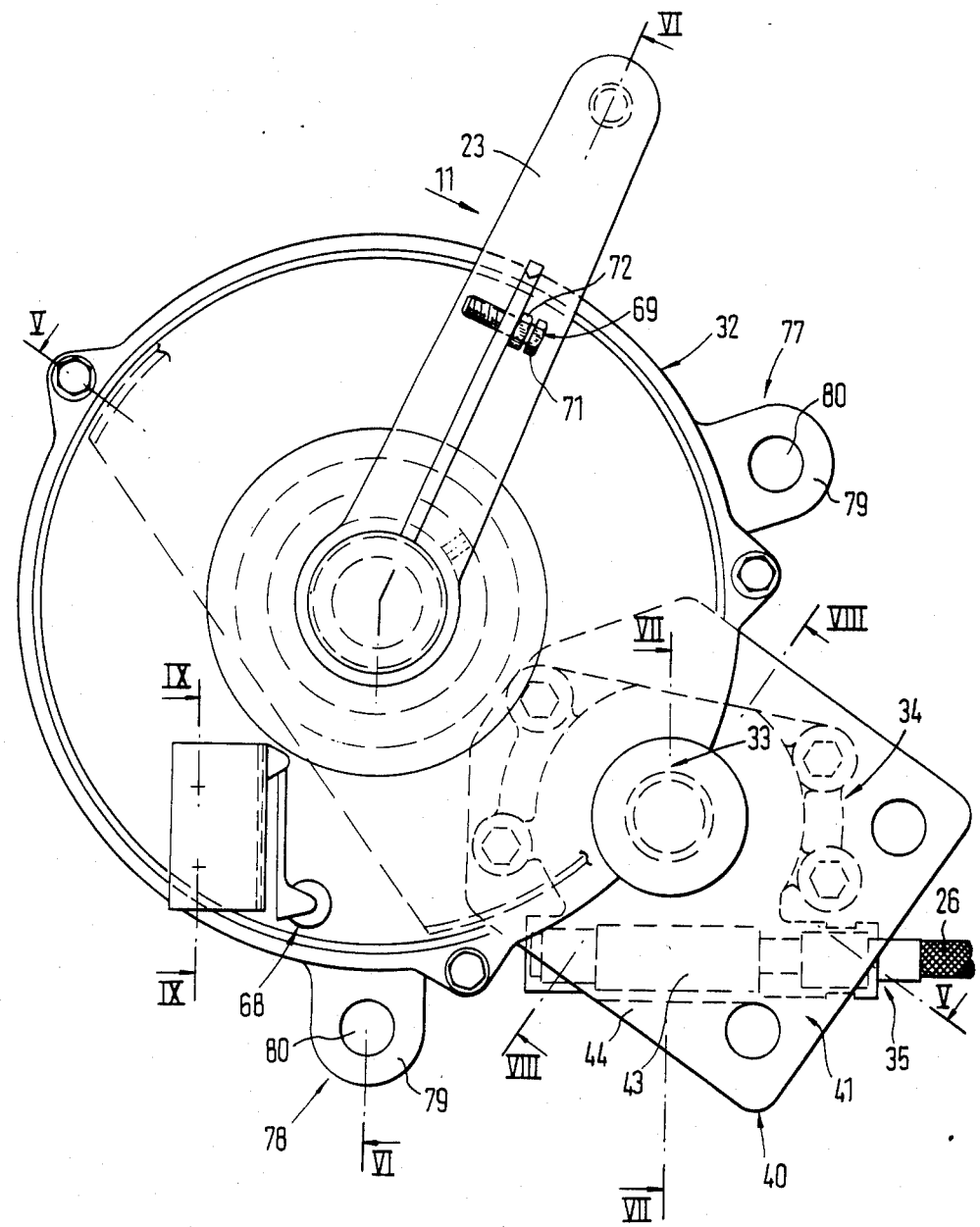
FIG. 4 is a partial side elevational view of the transmission unit corresponding to FIG. 1, on an enlarged scale.
Figure 5:
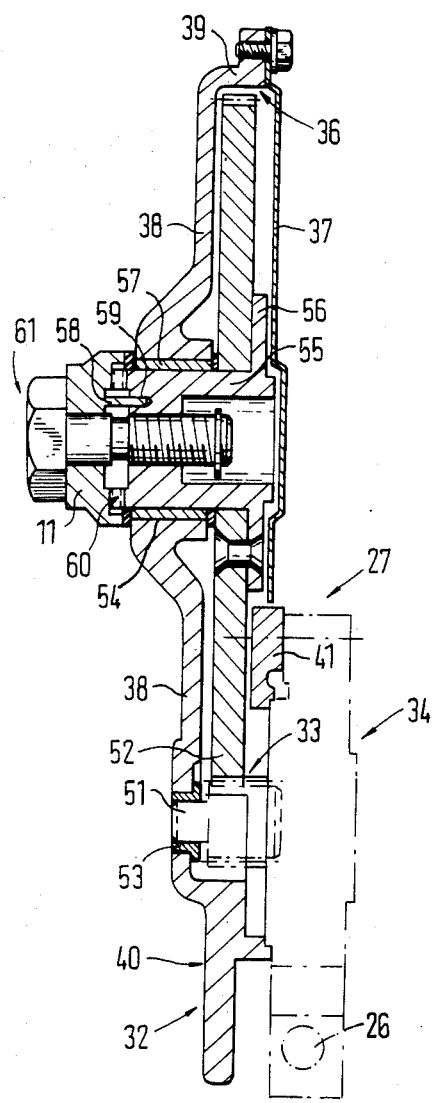
FIG. 5 is a cross-sectional view, taken along line V—V of FIG. 4.
Figure 6:
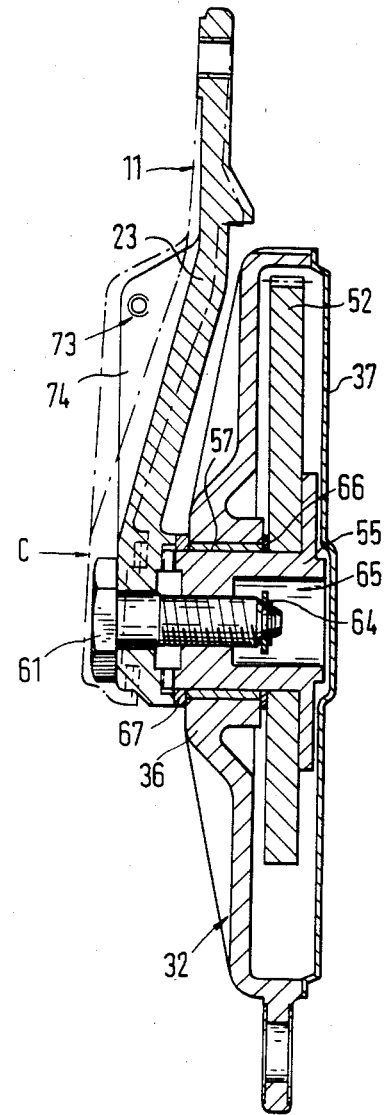
FIG. 6 is a cross-sectional view taken along line VI—VI of FIG. 4.

Each transmission unit includes according to FIGS. 4 to 6, a spur gear transmission generally designated by reference numeral 33 and arranged in a fixedly supported housing 32 and a planet gear transmission generally designated by reference numeral 34 cooperating with the spur gear transmission 33; the planetary gear transmission 34 is operatively connected with the free end 35 of the flexible shaft 26.

The housing 32 includes a relatively flat pot-shaped housing part 36 for the spur gear transmission 33 and the planet gear transmission 34, whereby the open side is closed off by means of a lid-like covering 37 (FIG. 5). The lid-like covering 37 is formed by a stamped-out or pressed-out part made from metal or plastic material and is secured at the housing part 36 by bolts. The housing part 36 is preferably formed by a cast part and is composed of a vertically extending housing wall 38 and of an edge section 39 extending approximately at a right angle thereto. According to FIG. 4, the housing part 36 has a cylindrical base shape, whereby an outwardly directed, approximately rectangularly shaped extension generally designated by reference numeral 40 is formed-on locally at the circumference of the cylinder. A support plate 41 is provided within the area of the extension 40 which is disposed parallel to the vertical housing wall 38 and extends at a distance with respect thereto; the planet gear transmission 34 is flangedly connected to the outside of the support plate 41. The fastening of the planetary gear 34 takes place by bolts or the like.

Figure 7:
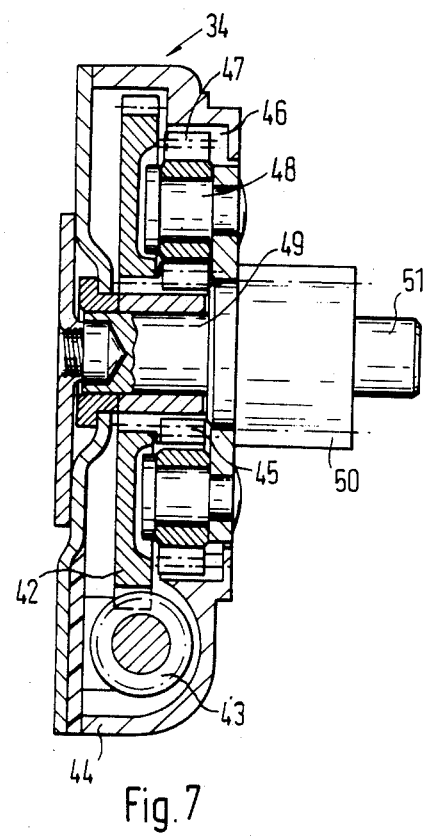
FIG. 7 is a cross-sectional view taken along line VII—VII of FIG. 4, on an enlarged scale.

The planet gear transmission 34 includes a worm follower gear 42 which cooperates with a worm 43 (FIG. 7) rigidly coupled with the free end 35 of the flexible shafts 26 (FIG. 7). The worm 43 is rotatably supported inside of the housing 44 of the planet gear transmission 34. Additionally, the planet gear transmission 34 includes a driven sun gear 45, a fixed ring gear 46, and several planet gears 47 which are rotatably supported on a planet carrier 48. During rotary movement of the worm gear 42 and of the sun gear 45 securely connected thereto for rotation in unison therewith, the planet gear carrier 48 and the output shaft 49 connected therewith rotate in the same direction. The four planet gears 47 thereby roll off in the ring gear 46 so that the planet gear carrier 48 and therewith the output shaft 49 rotate slower than the driven sun gear 45.

Figure 8:
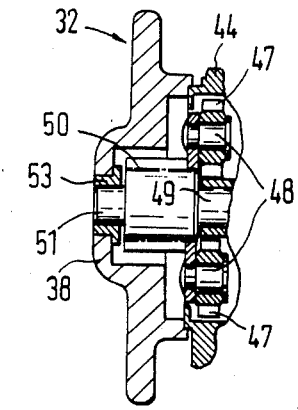
FIG. 8 is a cross-sectional view taken along line VIII—VIII of FIG. 4.

The output shaft 49 of the planet gear transmission 34 includes an output pinion 50 located within an area disposed outside of the housing 44 and a cylindrical end section 51 whereby the output pinion 50 meshes with a vertically arranged toothed segment 52 and the cylindrical section 51 is rotatably supported in the vertically extending housing wall 38 by means of a bearing bushing 53 (FIG. 8). The toothed segment 52 is carried by a bearing bolt 55 received in a bearing eye 54 of the vertical housing wall 38, whereby the toothed segment 52 is slipped over the bearing bolt 55 and is securely connected with a radially extending collar or flange 56 of the bearing bolt 55 by riveting.

According to FIG. 5, a bearing bushing 57 is provided for receiving the bearing bolt 55, which is pressed into the bearing eye 54. The bearing bolt 55 extends through the bearing eye 54 of the housing wall 38 and is connected securely outside of the housing wall 38 with the adjusting guide lever 11. The connection between the adjusting guide member 11 and the bearing bolt 55 takes place form-lockingly and force-lockingly. A pin 58 formed-on at the adjusting guide member 11 thereby engages into a bore 59 of the bearing bolt 55 arranged in the end face thereof. Additionally, the adjusting guide member 11 and the bearing bolt 55 are connected with each other by a toothed arrangement 60, and the adjusting guide member 11 is clamped against the bearing bolt 55 by means of an axially arranged bolt 61.

Figure 2:
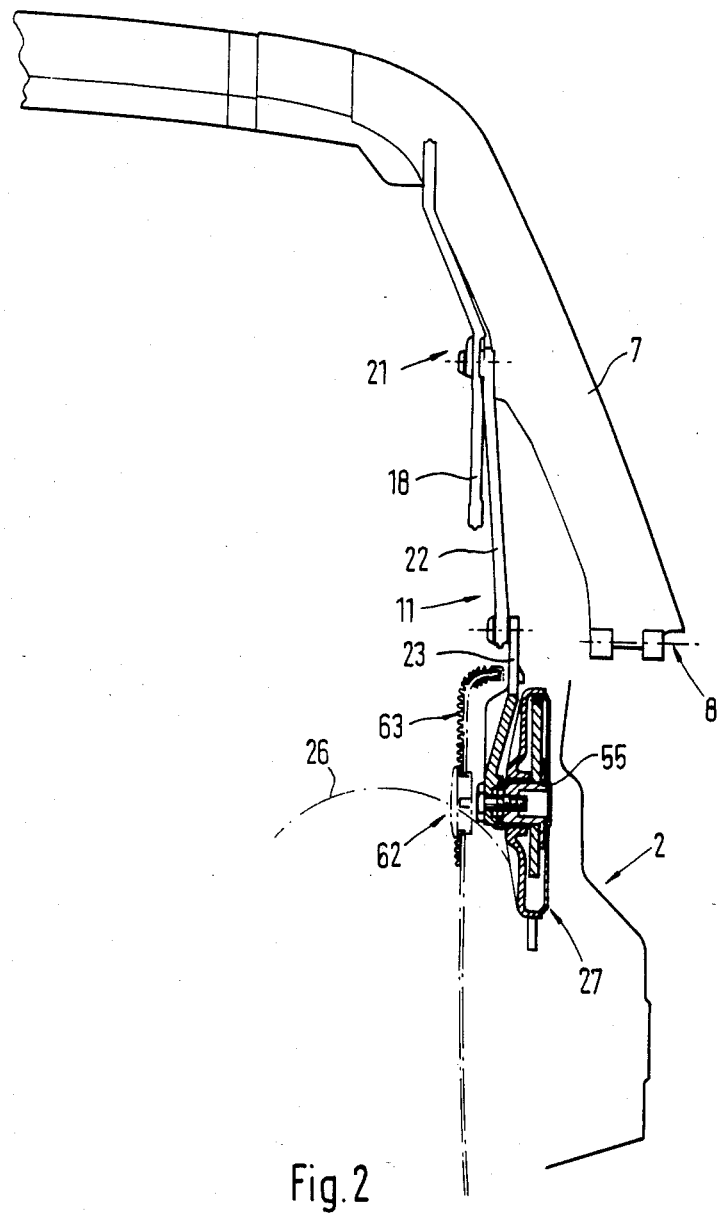
FIG. 2 is an elevational view, partly in cross section, taken in the direction of arrow R of FIG. 1.

If for reasons of a failure in the electrical system, a motorized pivoting of the folding roof 4 is no longer possible, then after removal of a cover cap 62 (FIG. 2) out of the side covering generally designated by reference numeral 63, the bolt 61 is disengaged by means of a socket wrench (not shown), whereby a separation takes place between adjusting guide member 11 and bearing bolt 55. Thereafter, the folding roof 4 can be manually pivoted by means of the pivotal lever system 6. In the illustrated embodiment, the bolt head of the bolt 61 has such a dimension that it can be actuated by means of a conventional spark plug socket wrench. Preferably, the adjusting guide member 11 has such a prestress that it is automatically moved into a release position C (FIG. 6) after the disconnection of the bolt 61.

In order to prevent the disconnected bolt 61 from falling out of the bearing bolt 55, a retaining ring 64 is provided at the bolt 61 the the end thereof. This retaining ring 64 is introduced through a cylindrical aperture 65 of the bearing bolt 55 after the adjusting guide member 11 and bearing bolt 55 are screwed together, and is installed thereafter. For axially securing the bearing bolt 55, disks 66 and 67 (FIG. 6) made of plastic material are provided, on the one hand, between the bearing bushing 57 and the toothed segment 52 and, on the other, between the adjusting guide member 11 and the housing part 36.

Figure 9:
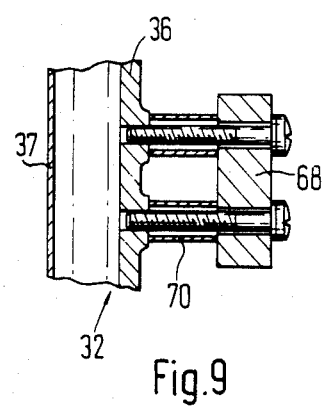
FIG. 9 is a cross-sectional view taken along line IX—IX of FIG. 4.

For limiting the adjusting movement of the adjusting guide member 11, a limit switch 68 (FIGS. 4 and 9) is attached at the housing 32, which is actuated by an abutment 69 arranged at the adjusting guide member 11. The limit switch 68 is secured at the housing part 36 of the housing 32 by means of bolts, whereby spacer sleeves 70 are provided between the limit switch 68 and the housing 32, through which extend the bolts.

The abutment 69 is formed by a bolt 71 with counter-nut 72 (FIG. 4), whereby the bolt 71 is inserted into a threaded bore 73 (FIG. 6) of a web 74 of the adjusting guide member 11 and the bolt head actuates the limit switch 68. The web 74 is provided on the side of the adjusting guide member 11 opposite the housing part 36.

Figure 10:
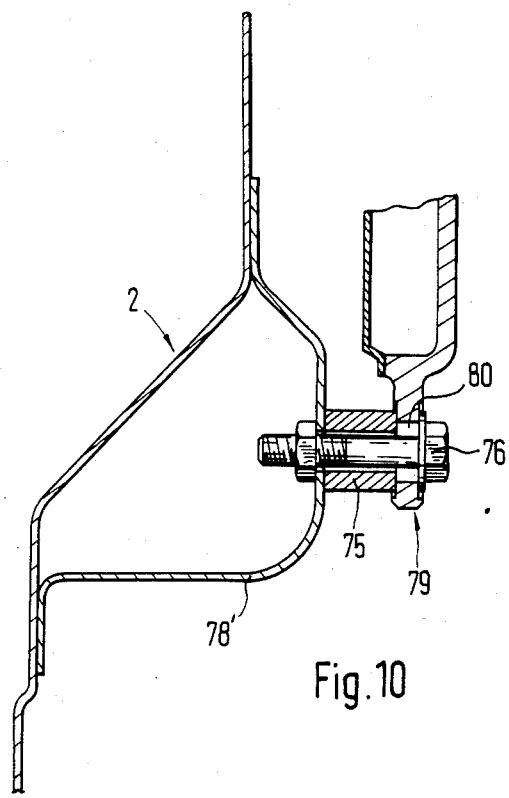
FIG. 10 is a cross-sectional view taken along line X—X of FIG. 1.

The housing part 36 of the transmission unit 27 is kept in position at angle support members 78' on the side of the body by interposition of spacer sleeves 75 (FIG. 10) and fastening bolts 76. Fastening eyes 79 with through-openings 80 are formed-on at the housing 36 at 77 and 78 for receiving the fastening bolts 76.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A driving arrangement for pivoting a folding roof of a motor vehicle between an open position and a closed position, comprising
    driving motor means;
    transmission means adapted to be arranged on each side of a body of the motor vehicle;
    flexible shaft means for drivingly connecting the driving motor means with each transmission means;
    pivotal lever arrangement including an adjusting guide means, the transmission means being operatively connected to the adjusting guide means;
    fixedly supported housing means for housing the transmission means, said housing means including a vertically extending wall having a bearing eye and a bearing bolt extending through the bearing eye;
    wherein the transmission means further comprises,
    a spur gear transmission means including a toothed segment operatively connected with the adjusting guide means "for identical angular rotation", said spur gear transmission means being rotatably supported in the housing wall; and
    a planet gear transmission means operatively connected to the flexible shaft, said planet gear transmission means including an output pinion, said output pinion meshing with the toothed segment of the spur gear transmission means and being supported in the housing wall,
    wherein the bearing bolt carries the toothed segment of the spur gear transmission means on the inside of the housing means, and
    wherein the bearing bolt is connected with the adjusting guide means on the outside of the housing means.

2. A driving arrangement according to claim 1, further comprising a cover means, wherein said housing means consists of a relatively flat pot-shaped housing part, a portion of said housing part for receiving the spur gear transmission means and the planet gear transmission means, and a portion of the pot-shaped housing part being closed off by the cover means.

3. A driving arrangement according to claim 2, wherein said housing part is formed by a casting.

4. A driving arrangement according to claim 2, wherein the cover means is formed of a pressed-out part consisting of metal or plastic material.

5. A driving arrangement according to claim 2, wherein the housing part has a cylindrical base shape, a substantially rectangularly shaped extension being formed-on locally along the circumference of said housing part, said extension including a mounting plate onto which the planet gear transmission means is flangedly connected.

6. A driving arrangement according to claim 1, wherein the output pinion of the planet gear transmission means is rotatably supported in the housing wall of the housing means by means of a bearing bushing.

7. A driving arrangement according to claim 1, wherein the bearing bolt is rotatably received in a bearing sleeve inserted into the bearing eye.

8. A driving arrangement according to claim 1, wherein the toothed segment is slipped over the bearing bolt and is riveted to an end-face, radially extending collar of the bearing bolt.

9. A driving arrangement according to claim 1, wherein the adjusting guide means is form-lockingly and force-lockingly connected with the bearing bolt.

10. A driving arrangement according to claim 9, wherein the adjusting guide means and the bearing bolt cooperate by way of toothed means, and wherein the adjusting guide means is clamped against the bearing bolt by way of an axially arranged bolt.

11. A driving arrangement according to claim 10, wherein a disk of plastic material is provided between the adjusting guide means and the housing wall, said disk surrounding the bearing bolt.

12. A driving arrangement according to claim 1, wherein a disk of plastic material is provided between the bearing eye and the toothed segment for axially securing the toothed segment.

13. A driving arrangement according to claim 10, wherein the axially arranged bolt is secured against falling out by means of a retaining ring.

14. A driving arrangement according to claim 10, wherein the adjusting guide means is separated from the transmission unit by disconnecting the axially arranged bolt and allowing the folding roof to be manually actuatable.

15. A driving arrangement according to claim 14, wherein the adjusting guide means has such a prestress that after release of the axially arranged bolt, the adjusting guide means is automatically moved into a release position.

16. A driving arrangement according to Claim 1, wherein the adjusting guide means is cranked, and wherein a web is provided on a side of the adjusting guide means opposite the housing means, said web being provided with a threaded opening into which an abutment is adapted to be inserted, and said abutment actuating a limit switch attached to the housing means.

17. A driving arrangement according to claim 14, further comprising a cover means, wherein said housing means consists of a relatively flat pot-shaped housing part, a portion of said housing part for receiving the spur gear transmission means and the planet gear transmission means, and a portion of the pot-shaped housing part being closed off by the cover means.

18. A driving arrangement according to claim 17, wherein the housing part has a cylindrical base shape, a substantially rectangularly shaped extension being formed-on locally along the circumference of said housing part, said extension including a mounting plate onto which the planet gear transmission means is flangedly connected.

19. A driving arrangement according to claim 18, wherein the adjusting guide means is form-lockingly and force-lockingly connected with the bearing bolt.

20. A driving arrangement according to claim 19, wherein the adjusting guide means and the bearing bolt cooperate by way of toothed means, and wherein the adjusting guide means is clamped against the bearing bolt by way of an axially arranged bolt.

21. A driving arrangement according to claim 1, further comprising an axially arranged bolt means, wherein the axially arranged bolt means clamps the adjusting guide means against the bearing bolt.

22. A driving arrangement according to claim 21, wherein the adjusting guide means is separated from the transmission unit by disconnecting the axially arranged bolt means and the folding roof is then manually actuatable.

23. A driving arrangement according to claim 22, wherein the adjusting guide means is prestressed so that after release of the axially arranged bolt means, the adjusting guide means is automatically moved into a release position.

* * * * *